United States Patent [19]

Dunajtschik

[11] Patent Number: 4,586,457

[45] Date of Patent: May 6, 1986

[54] DRUM-EQUIPPED APPARATUS FOR THE PRODUCTION OF COATED PILLS

[75] Inventor: Rudolf Dunajtschik, Lindau-Bodolz, Fed. Rep. of Germany

[73] Assignee: Driam Metallprodukt GmbH & Co. KG, Eriskirch, Fed. Rep. of Germany

[21] Appl. No.: 676,396

[22] PCT Filed: Mar. 13, 1984

[86] PCT No.: PCT/EP84/00072
§ 371 Date: Nov. 16, 1984
§ 102(e) Date: Nov. 16, 1984

[87] PCT Pub. No.: WO84/03609
PCT Pub. Date: Sep. 27, 1984

[30] Foreign Application Priority Data

Mar. 19, 1983 [DE] Fed. Rep. of Germany ....... 3310031

[51] Int. Cl.⁴ .......................... B05C 5/00; B05B 17/00
[52] U.S. Cl. ......................................... 118/19; 118/303
[58] Field of Search ............................ 118/19, 303, 417

[56] References Cited

U.S. PATENT DOCUMENTS

| 2,734,406 | 2/1956 | O'Malley | 80/55 |
| 3,390,490 | 7/1968 | Hesslenberg | 118/417 X |
| 3,923,349 | 12/1975 | Herbst | 308/26 |
| 4,245,580 | 1/1981 | Okawara | 118/19 |
| 4,274,360 | 6/1981 | Hofmann et al. | 118/303 |
| 4,499,847 | 2/1985 | Dunaitschik | 118/19 |

FOREIGN PATENT DOCUMENTS

| 2212985 | 9/1973 | Fed. Rep. of Germany . |
| 3131808 | 2/1983 | Fed. Rep. of Germany . |
| 788167 | 10/1935 | France . |
| 963049 | 6/1950 | France . |
| 1309022 | 12/1960 | France . |
| 2416740 | 9/1979 | France . |

Primary Examiner—Shrive P. Beck
Attorney, Agent, or Firm—Karl F. Ross; Herbert Dubno

[57] ABSTRACT

A pill-coating apparatus for covering granulets such as pill cores with a multilayer coating has a coating drum rotatable about a substantially horizontal axis, the drum being formed with a hub at each axial end thereof supported in two pivot bearings axially spaced apart from one another, wherein at least one of the two pivot bearings is formed as a rotatable linkage, comprising a roller bearing connected to a support rotatably adjustable in any direction.

17 Claims, 8 Drawing Figures

DRUM-EQUIPPED APPARATUS FOR THE PRODUCTION OF COATED PILLS

FIELD OF THE INVENTION

The invention relates to an apparatus for the production of coated pills wherein granulated materials such as pill cores are covered with a multilayer coating, the apparatus being provided with a drum confined to rotate about an horizontal axis being supported on two pivot bearings axially displaced with respect to each other.

BACKGROUND OF THE INVENTION

In the case of a known device for coating pills of this kind, larger drums are mostly supported via crown bearings, namely two annular rails are mounted on the periphery of the drum at both ends, these rails being rotatably supported on bearing rollers fastened to the base. The operation of such drums however have various disadvantages. For one, the rotation produces constant wobbling resulting in uneven coating. In addition to that, since the running speed at the bearing point is relatively high due to the large diameter of the drum, the operation of the drum causes to constant, disturbing noise.

In order to avoid that, smaller drums of such apparatus were supported overhung at one end (German open application No. 28 05 801), whereby at the opposite frontal end of the drum a closable loading opening is provided. Various advantages regarding the loading and unloading derive from this construction and the support can be achieved in this case with two relatively small roller bearings mounted relatively close to each other, without having to absorb substantial axial forces or tilting moments.

In order to continuously lower the processing and manufacturing costs of pills and comparable pharmaceutical products, as well as sweets, lately larger and larger drums are used, which have to be supported at both frontal ends in pivot bearings (German open application No. 31 31 808). The rolling effect, the layer height, the drying action and many other characteristics vary with the diameter of the drum and therefore the length of the drum is selected correspondingly dimensioned. This leads in the case of reasonable and economical constructions, respectively a light construction of the drum, to deflection, meaning that the duct connections laterally molded to the drum and respectively the support hubs become tilted with respect to the horizontal. High edge pressures result with slide bearings or even regular roller bearings and the use of self-aligning bearings is here too expensive. On the other hand, the use of roller bearings is preferred due to reduced resistance to rotation and the improvement of hygienic conditions.

OBJECT OF THE INVENTION

The present invention departs from the aforedescribed apparatus for making coated pills and attains the object to develop an improved apparatus in the simplest possible way to reduce the cost of the bearing, the axial and edge load to be absorbed and to prolong the life of the bearing.

SUMMARY OF THE INVENTION

This object is attained according to the invention by having at least one of the two pivot bearings built as a rotatable linkage consisting of a light roller bearing which is connected to a support, rotatably adjustable in any direction. As opposed to more expensive self-aligning bearings or the like, the alignment in this case takes place not at the roller surface itself but the roller bearing remains unaffected with its inner- and outer rings and is freed from the effect of forces only by the linkage of one of its two rings to the support which is capable of turning in any direction. Since only reduced, neglectable axial forces result from the operation of the drum, the bearings to be used can be dimensioned considering the pure radial load only. It is best to use in this case a simple and detachable ball journal bearing, respectively regular grooved ball bearings. Actually one can use in this case what trade people denigratorily call "turning connections" or "paper bearings". The cost savings resulting therefrom are so important that they can not be exhausted even with a very sophisticated system of rotation-adjustment control.

At least the pivot bearing used as a fixed support can therefore be arranged in cardanic suspension through two cardanic swivel axes crossing each other. When dimensioning this suspension only the bearing load to be carried over is to be considered, which requires per se already such rigid dimensioning that the reduced axial forces can be safely carried over concurrently.

The pivot bearing in cardanic suspension is then suitably arranged close to the drum drive, while the second pivot bearing located at the other end of the drum has at least one connecting part with respect to which the drum end is kept rotatably adjustable in any direction and longitudinally slidable.

The free bearing has also to be provided with swingability and with self-acting axial adjustability, but practically this displaceability is of little importance, since just as the reduced axial forces it becomes effective only as a result of temperature differences between the drum and its surroundings, respectively between the drum and one of the frames supporting the drum or a base plate. Such temperature differences can practically appear only during breaks in operation. But, since large drums, disregarding the rapidly performed feeding and discharge processes, are set up for long-lasting operation the free bearing steadily maintains during the process its once-assumed position.

In a preferred embodiment of the invention the cardanic suspension comprises an outer cardan frame maintained around a first axis of rotation in a fixed support via two coaxial link pins and an inner cardan ring swingable around a second rotation axis extending vertically with respect to the first, the inner cardan ring being connected with the outer ring of the roller bearing. In principle, the inner cardan rings can also rest directly on a drum hub.

In advantageous construction, support, respectively coupling means are provided between the cardan ring and pill-coating drum for the direct mounting and securing of the drum in turning position, which can be important for feeding- and discharging operations, for overall cleaning and most important for the installation processes.

This can be achieved relatively simply by providing in the second (inner) rotation axis at least one joint bolt passing through the outer cardan frame and the inner cardan ring, this bolt being radially adjustable until it engages in a coupling recess on the drum hub. For instance, the joint bolt provided in the vertical joint axis at the bottom can be kept centered in the inner cardan ring by threading it therein. In this manner, the drum end for instance can be somewhat lifted without the use of special lifting tools, in order to release the bearing for its replacement and for instance to facilitate the replacement of a drive pulley. In such embodiments, the mounting is effected manually. Of course, instead of the threaded connection a power-actuating means, something like a pressure-medium cylinder can be provided and under certain circumstances can be automatically controlled as preestablished in the operation cycle.

A further problem arises in the case of apparatus for production of coated pills, wherein drying air is directed in a flow distributor through a transition surface between the flow ducts provided at the drum and the connections attached to the housing. At this transition surface due to the deflection of the drum corresponding to the inclination of the bearing axis with respect to the theoretical median axis, deviations between the parts of the equipment directed towards each other in this area can occur, which can lead in addition to leaks and to wear and future production breakdowns.

In accordance with the invention, it is proposed as a remedy that the non-rotatably arranged parts of the flow distributor, at least in the transition area, be self-alignable with respect to the drum. This can be achieved relatively simply by providing that the non-rotatable parts of the flow distributor be connected to those parts of the drum bearings, particularly of the fixed bearing which are non-rotatable and self-aligning with respect to the drum. In the case of an inclined position of the axis of the pertaining drum hub as a result of a deflection in the median portion of the drum, the non-rotatable parts which anyway must be somehow secured against being entrained in the rotation, are brought in an inclined position of the axis as a consequence, which leads to an inclined position of the transition surface. In principle, it is thus possible to connect the non-rotatable part of the flow distributor simply with the rim seals of the flow ducts on the rotatable part, but otherwise keeping it completely freely suspended, without mechanical contact at the transition surface. But even then when both parts of the flow distributor are directly supported on each other in this area, unnecessary stresses can be prevented through readjustment. Thereby it is self-understood that the connecting elements leading from the flow distributor to the outside—advantageously hoses—are designed to be flexible to follow reduced tumbling movements.

In the case of this readjustment, the way of achieving the rotation adjustability is in itself without particular importance. In a gimbal bearing the non-rotatable parts have in any case to be connected in a rigid manner to the inner cardan ring, whereby something like an annular disk attached to the inner end of the inner ring, especially via star-like radially extending arms, is connected with the non-rotatable part of the flow distributor.

Between the second pivot bearing and a cylindrical outer surface of a drum hub a toroidal surface concentric therewith can be provided. It is self-understood that in this case two rings can be provided whereby the toroidal surface has the shape of a ball race surface whose center lies in the axis of the drum hub. But it is simpler to curve the toroidal surface provided at the inside of the second pivot bearing convexly towards the inside and to allow it to embrace the cylindrical surface with circumferential play for inclination. Thereby only a punctiform support results in principle, which under load increases to a few mm of supporting surfaces, but the only relative motion should consist of an axial shifting during operation breaks of less than 1 mm. For this the existing surface pressures are acceptable. Also no special measures have to be taken to keep the slide resistance here relatively small since, especially in the production of sweets, the air always has such a content of humidity with particularly lubricating components, so that practically there is no dry friction to overcome.

Between the rotatable inner part of the second pivot bearing an entrainment connection, such as a projection running somewhat parallelly to the axis of the drum should however be provided to engage with longitudinal play in the radial notch of the other part. By providing correspondingly constructed coupling devices it can be insured in principle that the toroidal surface itself is completely freed from radial forces.

BRIEF DESCRIPTION OF THE DRAWING

The aboe and other objects, features and advantages of the invention will become more readily apparent from the following description, reference being made to the accompanying drawing, in which.

SPECIFIC DESCRIPTION

The represented apparatus for coating pills consists basically of a machine frame 1, the coating drum 2, a drive 3, a flow distributor 4 with a connection not shown in the drawing to an exhaust- and pressure blower, a coat-application device, of which only the material supply duct 5 is shown here and a housing 6 enclosing the drum 2 on the machine frame 1.

Figure 1:
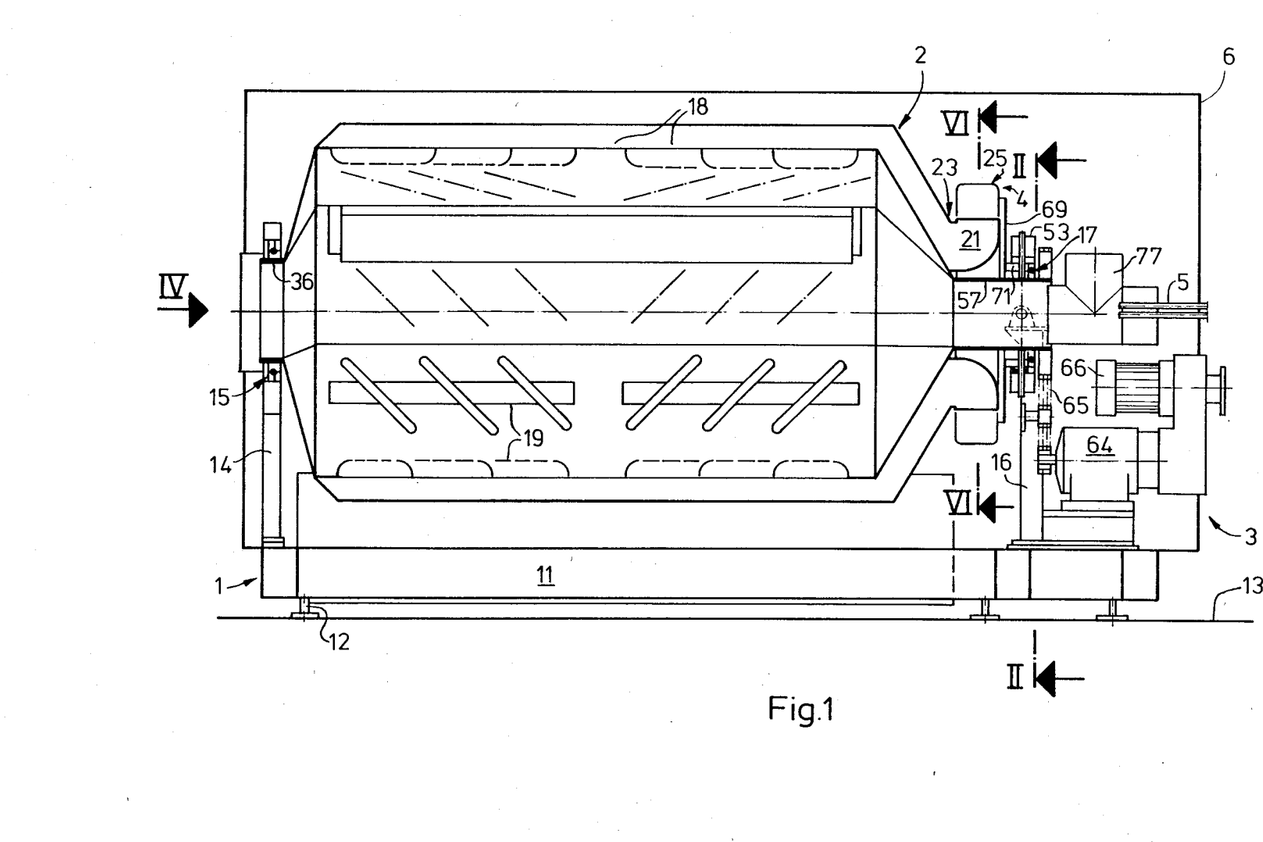
FIG. 1 is a partially sectioned diagrammatic sideview of an apparatus for coating pills according to the invention.
Figure 2:
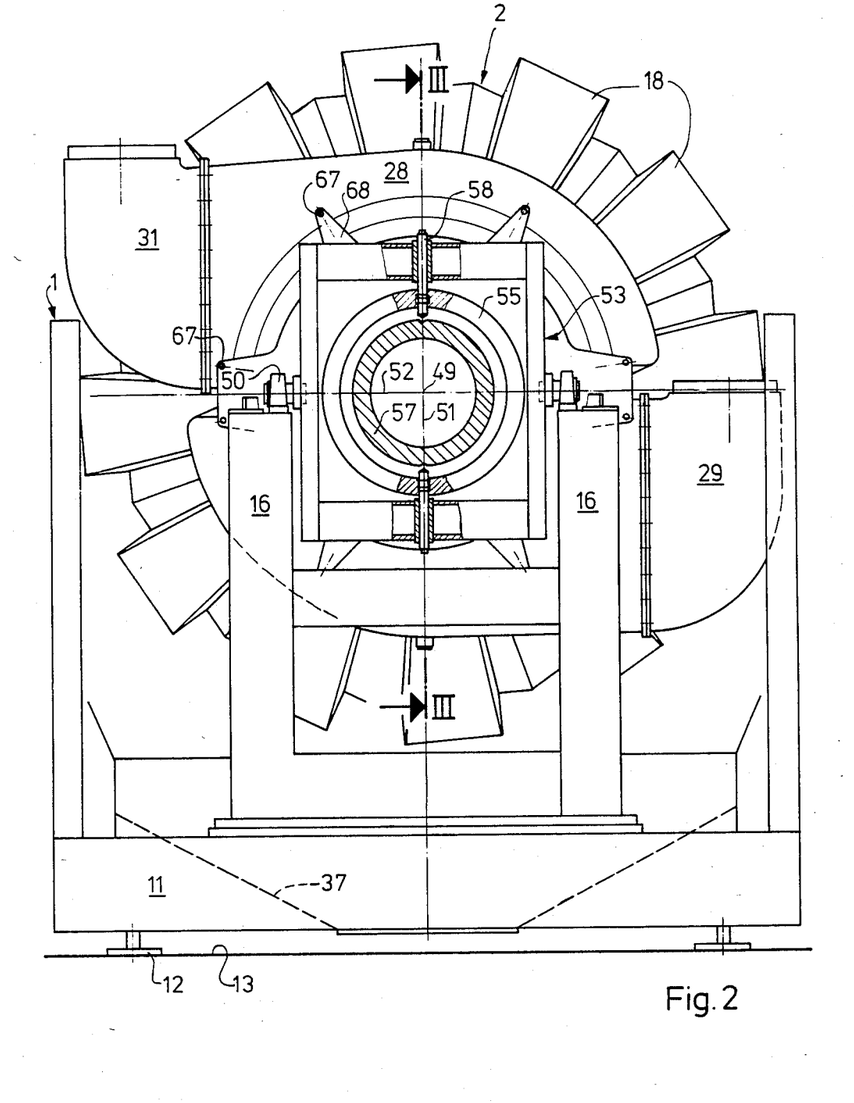
FIG. 2 is an enlarged section through this apparatus taken along to line II—II of FIG. 1.
Figure 3:
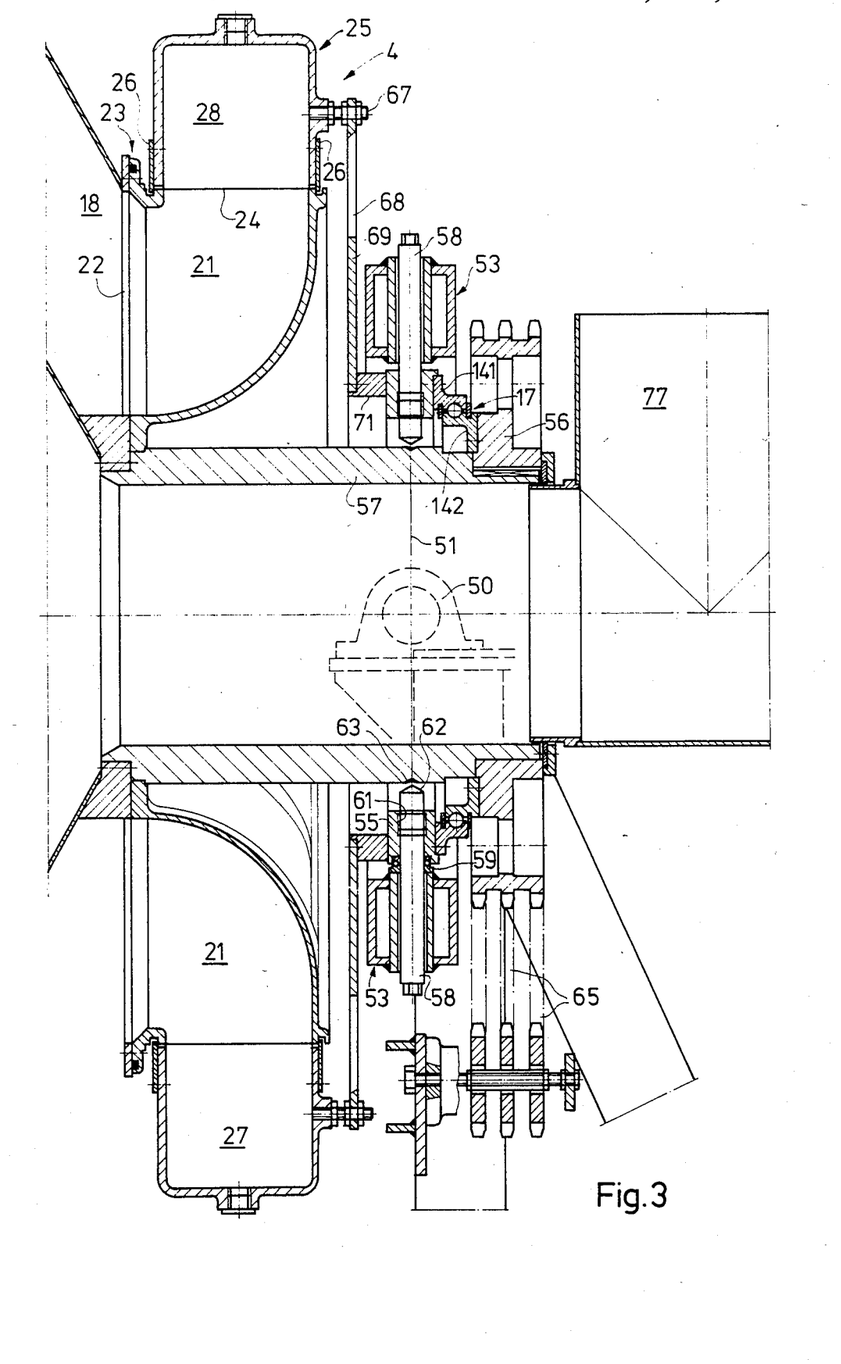
FIG. 3 is a further enlarged partial section taken along line III—III of FIG. 2.
Figure 4:
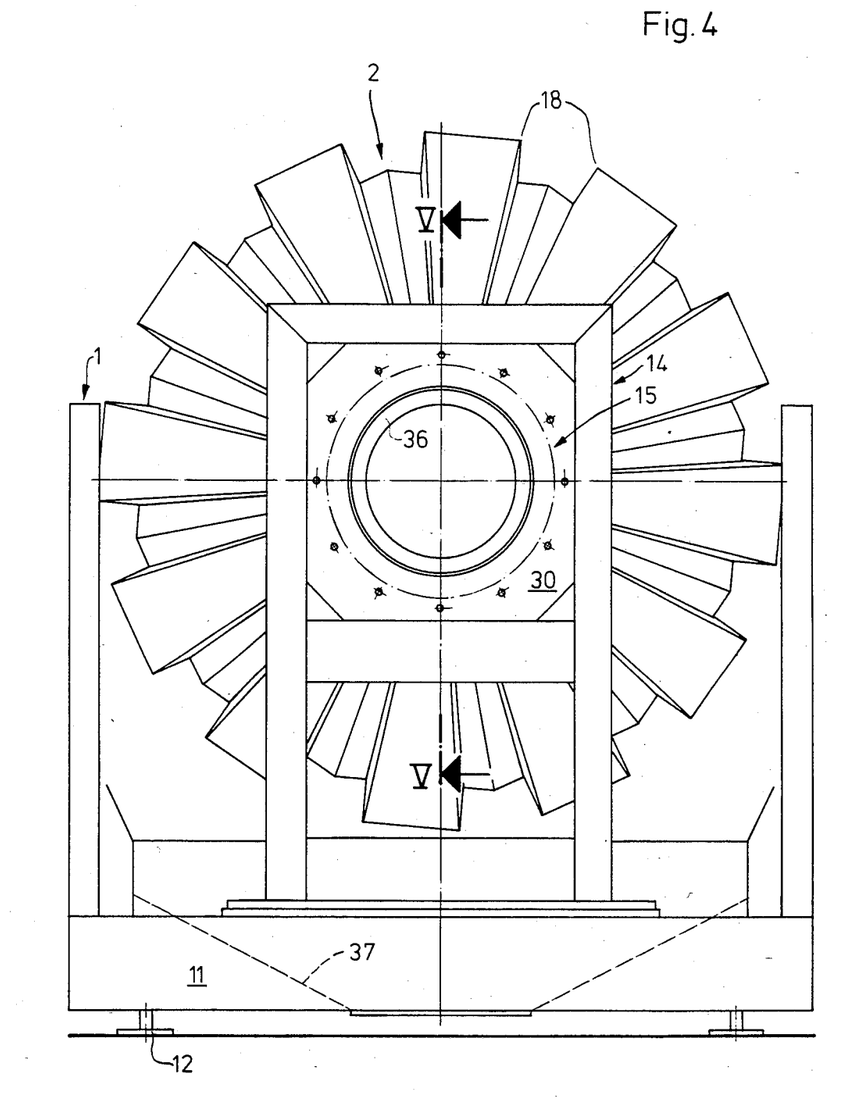
FIG. 4 is a front elevational view of the apparatus taken in the direction of arrow IV from the left in FIG. 1.
Figures 5, 5A, 7:
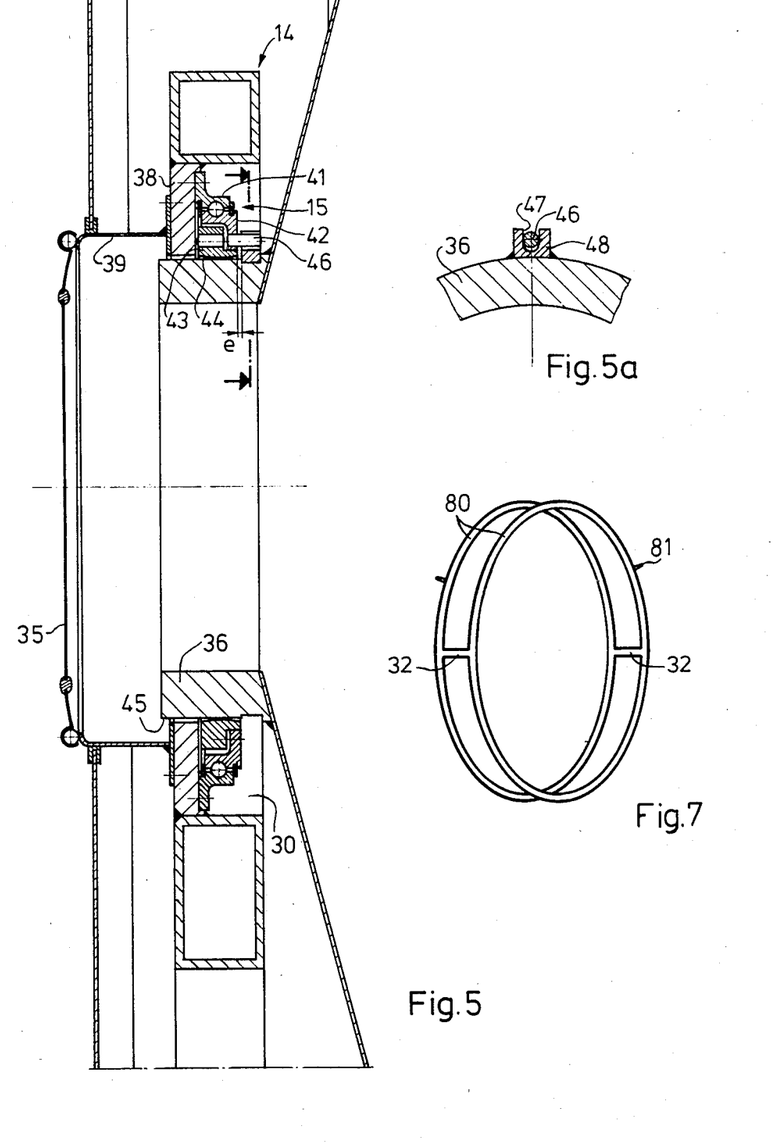
FIG. 5 is a partial section taken along the line of V—V of FIG. 4.
FIG. 5a is a further partial section taken along the section line in FIG. 5.
FIG. 7 is a sealing arrangement for the flow distributor.

The main part of the machine frame 1 is the base plate 11 which is a hollow box structure held on the mounting surface 13 by means of height-adjustable legs 12, and supports a free bearing 15 via a frontal support 14 as can be seen in FIGS. 4 and 5 as well as a fixed bearing 17 via rear support 16 as represented in detail in FIG. 2 and 3. In principle, the pill coating apparatus with the coating drum 2 derives from the German open application No. 31 31 808. However, while there a nonagonal drum is used, in the present case a dodecanal drum is used. Correspondingly, twelve ducts 18 are provided, each being connected to the inner space of the drum through air passages 19 of various shapes and at their right ends according to FIG. 1 are connected each with one connecting chamber 21 of the rotatable part 23 of the flow distributor 4, this rotatable part being flanged to the frontal flange 22 of the drum and sealed against the drum.

Figure 6:
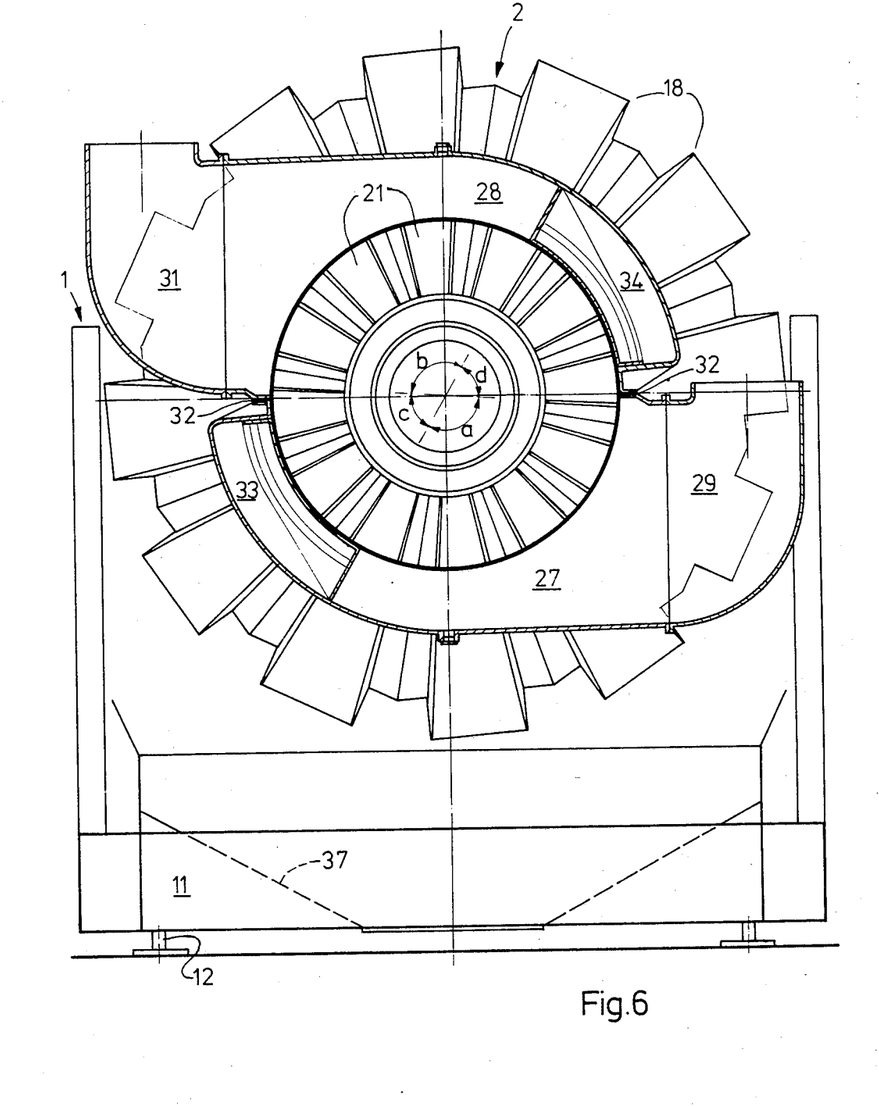
FIG. 6 is a section taken along line VI—VI of FIG. 1.

In a circumferential surface 24 the rotatable part is sealedly surrounded with respect to the nonrotatable part 25 via lateral sealing segments 26. This nonrotatable part is composed, as can be seen from FIG. 6, of a lower channel segment 27 and an upper channel segment 28 which have two connecting elbows 29, 31 opposite to each other each extending over 180° approximately and shielded with respect to each other by sealing strips 32. In principle, half of the circumference can be used to blow in, while the opposite half of the circumference can be used for evacuation, and exhaust.

In both channel segments replaceable shutters 33, 34 are however built in, by means of which the effective connection angle a of the lower channel segment with respect to the connection angle b of the upper channel segment 28 can be maintained at a circumferential distance corresponding to angles c, and d. These distances are necessary to insure that the lower connection angle a is always smaller than the rest angle of the bed of granulates to be treated in the coating drum. It is therefore understandable that each chamber 21 is cut off from the lower channel segment 27 at the circumference of the coating drum in the area of the angle c, clockwise according to FIG. 6, before it comes into contact with the upper channel segment in the area of the connection angle b. Depending on which of the connection elbows 29 or 31 is switched to pressure or negative pressure, the flow passes through the bed of granulates from below or from above.

The coating drum can be fed in the known manner via the drum hub 36 covered with the lid 35 or in a different manner. For the discharge a portion of the wall is suitably hinged, so that the entire charge of the drum can fall into the funnel 37, which is rigidly or movably mounted to the machine frame.

The bearing hub 36 is, as shown especially in FIG. 4, completely surrounded by the frame opening 30 of the support 14 welded from rectangular tubing. This frame opening is largely filled by a support plate 38 mounted inside of the support 14 which holds the lid 35 via a tubular connecting element 39 and to which the outer ring 41 of the free bearing 15 is flanged. The inner ring 42 is on the contrary rigidly bolted to an adjusting collar 43 which forms a convex toroidal surface 44 at its inside, the outer cylindrical surface 45 of the drum hub 36 resting thereagainst with a circumferential play permitting an inclined positioning of the drum.

In order to achieve a co-rotational connection of the rings 42 and 43 with the drum hub 36 a coupling pin 46 mounted on one of the rings or inserted between both of them is used, the pin protruding axially towards the right in FIG. 5 in a radial notch 47 of a fork-shaped piece 48 which is mounted on the bearing hub 36 with an axial distance e from the inner ring 42.

As a result, the drum end with its hub can move axially unrestricted with respect to the free bearing 15 rigidly mounted on the support 14 and due to the toroidal surface 44 can position itself inclined with respect to the horizontal line to a limited degree.

This way, the free bearing 15 is totally freed from axial forces as well as from edge loads through tilting. Practically, it transmits only purely radial forces, while the axial force can only reach a maximal value corresponding to that of the friction between the surfaces 44 and 45 in the case of heat expansion with respect to the fixed bearing 17.

The support 16 for the fixed bearing 17 is also made of rectangular tubing and thereby flexion-resistant and relatively rigid. There the bearing is not enclosed by the frame, but the support columns 16 end at a distance below the drum axis 49 and carry via two swivel bearings 50 an outer cardan frame 53 swingably adjustable in a horizontal axis 52 intersecting the drum axis 49 at an essentially right angle, the cardan frame again being made of rectangular tubing and carrying an inner cardan ring 55 in a vertical axis of rotation 51 intersecting both axes 49 and 52 at a right angle. The cardan ring 55 is according to FIG. 3 rigidly connected with the outer ring 141 of the fixed bearing 17, which has the same construction as the free bearing 15. The inner ring 142 is then connected with a drive sprocket 56 which in turn is rigidly mounted on the drum hub 57. Two joint bolts 58 each guided through the cardan frame 53 and the cardan ring 55 serve for support in the vertical joint axis 51. On the lower joint bolt a small roller bearing 59 is mounted and, used for transmitting the drum weight absorbed by the fixed bearing from the cardan ring 55 to the cardan frame 53. Both joint bolts 58 are positioned in the cardan ring 55 each with its threaded portion 61 and can be adjusted axially until their conical tips 62 engage countersinks 63 in the support hub 57 and thereby rotationally lock the drum in the machine frame while lifting it to a certain extent. This way mounting and dismounting are substantially facilitated since the bearing 17 can be set free by supporting it on the cardan ring 55. Thus it is possible to replace the bearing 17 and the drive sprocket 56 without using special lifting tools.

When the joint bolts 58 are unscrewed, the drum hub 57 rotatable in the almost exclusively radially stressed fixed bearing 17 is secured unequivocally in axial direction to the support 16 and thereby to the machine frame by being supported within the inner ring 142, the joint bolts 58, the cardan frame 53 and the swivel bearing 50. This way a connection adjustable in all directions cooperates on one side with the fixed bearing 17 and on the other side with the free bearing 15, which means that both drum hubs 36 and 57 are maintained freely swingable for adjustment. The pill-coating drum 2 can deflect almost at random and be built correspondingly lightweight.

Since the sprocket 56 is keyed on the support hub 57 close to the cardanic arrangement, the conditions of the chain 65 guided from the drive 64 practically do not change, no matter how the drive mechanism with the motor 66 is constructed.

The external nonrotatable part 25 of the flow distributor 4 can in principle be pivoted on the internal part 23, as long as it is secured against rotation. Since therefore additional axial space is required this nonrotational part is fastened via individual bolts 67, to individual arms 68 in a star-like arrangement of a disk 69 which in turn is connected with the cardan ring 55 by an intermediate ring 71. Thereby the nonrotatable part 25 of the flow distributor can adjust correspondingly to the rotatable part 23 when the drum is deflected and the drum hub 57 takes an inclined position in accordance therewith. Disregarding the sealing means and sealing plates, the inner and outer parts do not have to touch each other, these parts being mounted with small play between them.

The fastening of the rotatable part consisting of both channel segments 27 and 28 to individual bolts 67 arranged to equally divide the circumference has the additional advantage that the "nonrotatable part" 25 can be swung about the drum axis as desired and thereby to adjust it to a variable inclination of the surface of the bed of granulates to be treated in the drum. A direct fastening to each other of both channel segments is not even necessary. It is also possible to alter the length of the covering by the two shutters 33 and 34, by constructing these shutters to be either adjustable or replaceable, according to the need. The inner space of the coating drum is also in connection with the atmosphere via an angled duct element 77 attached to the drum hub 57. In principle, this angled element can also be used for supplying the pressurized air, in cases where for one reason or another the flow path can not run through the channel segment 28.

Since the gasket segments 26 and strip seals 32 always enclose all around the connection apertures of the channel segments 27, 28 and in addition seal these connection apertures onto each other in the cylindrical circumferential surface 24, the suction- and the pressure pathes are precisely separated from each other and also complete insulation against the outside air in the flow distributor 4 is insured. It is also possible in principle to completely seal the inner space of the coating drum 2 against the atmosphere, so that either directly or within the surrounding housing the process can run with recirculated air. In the flow path of the elbow duct 77 the degree of shut-off can be changed also by throttling.

The seal itself can thereby be further simplified, when according to FIG. 7 two annular seals in the form of annular tubes 80 are mounted between the rotatable and nonrotatable parts, these tubes being made of relatively soft, rubber-like moldable material with a smooth, sliding surface. These annular tubes can, similarly to bicycle tubes, also be provided with a valve 81, in order to be inflatable to the desired inner pressure. The strip seals 32 can remain unchanged in principle and gas-tight to isolate the channel segments 27, 28 from the inner space of the drum. These strip seals can in principle also be molded in one piece with the annular tubes 80.

I claim:

1. A pill-coating apparatus for covering granulates such as pill cores with a multilayer coating, said apparatus comprising a coating drum rotatable about a substantially horizontal axis, said drum being formed with a hub at each axial end thereof supported in two pivot bearings axially spaced with respect to each other, wherein at least one of said two pivot bearings is formed as a roatatable linkage, comprising a roller bearing connected to a support rotatably adjustable in any direction.

2. The pill-coating apparatus according to claim 1, wherein at least the other pivot bearing is used as a fixed support arranged in cardanic suspension having two cardanic swivel axes crossing each other.

3. The pill-coating apparatus according to claim 2 wherein said other pivot bearing in cardanic suspension is arranged close to a drum drive for rotating said drum and the pivot bearing provided at the other end of said drum has at least one coordinated connecting part with said drum, said drum end being kept rotatably adjustable in any direction and longitudinally slidable with respect to the pivot bearing.

4. The coating apparatus according to claim 2, wherein the cardanic suspension has an outer cardan frame pivotable around a first axis of rotation in a fixed support by two coaxial link pins and an inner cardan ring swingable around a second rotation axis extending perpendicular with respect to said first axis, said inner ring being connected to the outer race of said other pivot bearing.

5. The pill-coating apparatus according to claim 4, wherein between the inner cardan ring and the coating drum, supporting and coupling means are provided for the direct support and securing of the drum in its rotational position.

6. The pill-coating apparatus according to claim 5, wherein centered on the second rotation axis, at least one joint bolt passing through the outer cardan frame and the inner cardan ring is provided, said bolt being radially adjustable to engage in a coupling recess formed on the drum hub thereat.

7. The pill-coating apparatus according to claim 6, wherein said at least one joint bolt is adjustable in said inner cardan ring by being threaded therein.

8. The pill-coating apparatus according to claim 1, further comprising a flow distributor for drying-air distributed through a transition zone formed between flow ducts provied around the periphery of said drum and external connections thereto, wherein nonrotatably arranged parts of the flow distributor communicate with said flow ducts at a transition surface thereof and are self-alignably guided with respect thereto.

9. The pill-coating apparatus according to claim 8, wherein the nonrotatable parts of said flow distributor are connected to nonrotatable parts of said other pivot bearing, said parts being self-adjustable with respect to the position of said drum.

10. The pill-coating apparatus according to claim 9, wherein the nonrotatable parts of said flow distributor are connected with said inner cardan ring.

11. The pill-coating apparatus according to claim 10, wherein an annular disk is connected to said cardan ring, said disk being formed with star-like radially extending arms connected with the nonrotatable parts of said flow distributor.

12. The pill-coating apparatus according to claim 3, wherein between said pivot bearing at the other end of said drum and the cylindrical outer surface of the drum hub thereat a toroidal surface concentric to the hub is provided.

13. The pill-coating apparatus according to claim 12, wherein said toroidal surface is convexly curved towards the drum hub and embraces the cylindrical surface thereof with inclinational-circumferential play.

14. The pill-coating apparatus according to claim 3, wherein said at least one coordinated connecting part is formed by an entraining connection in the form of a projection extending from the pivot bearing at the other end of said drum substantially parallel to the axis of said drum, said projection engaging with longitudinal play in a radial notch formed on the drum hub thereat.

15. The pill-coating apparatus according to claim 8, wherein between the nonrotatable parts of said flow distributor and said transition surface, two axially spaced apart annular seals centrally enclosing a circumferential portion of said transition surface are provided, said annular seals being connected to one another by strip seals extending axially therebetween.

16. The pill-coating apparatus according to claim 14, wherein said annular seals are formed as annular tubes made of a moldable synthetic resin material having a slidable surface.

17. The pill-coating apparatus according to claim 16, wherein said annular tubes are provided with a check valve and are inflatable to a freely selectable pressure.

* * * * *